United States Patent
Baliga et al.

(10) Patent No.: US 7,388,881 B2
(45) Date of Patent: Jun. 17, 2008

(54) METHOD AND APPARATUS FOR FRAME SYNCHRONIZATION

(75) Inventors: Roshan Rajendra Baliga, Karnataka (IN); Rahul Garg, Haryana (IN); Rajendra Kumar, Karnataka (IN)

(73) Assignee: Ittiam Systems (P) Ltd., Bangalore (IN)

( * ) Notice: Subject to any disclaimer, the term of this patent is extended or adjusted under 35 U.S.C. 154(b) by 455 days.

(21) Appl. No.: 11/067,968

(22) Filed: Feb. 28, 2005

(65) Prior Publication Data

US 2005/0195770 A1 Sep. 8, 2005

Related U.S. Application Data

(60) Provisional application No. 60/549,677, filed on Mar. 2, 2004.

(51) Int. Cl.
*H04J 3/22* (2006.01)
(52) U.S. Cl. .................. 370/466; 370/514; 370/470; 370/507
(58) Field of Classification Search .............. 370/466, 370/514, 470, 335, 507
See application file for complete search history.

(56) References Cited

U.S. PATENT DOCUMENTS

| | | | | |
|---|---|---|---|---|
| 6,967,994 | B2* | 11/2005 | Boer et al. | 375/219 |
| 7,161,955 | B1* | 1/2007 | Zeng et al. | 370/466 |
| 7,161,996 | B1* | 1/2007 | Steele et al. | 375/347 |
| 7,187,724 | B2* | 3/2007 | Mennenga et al. | 375/316 |
| 7,236,544 | B2* | 6/2007 | Williams et al. | 375/316 |
| 2003/0147374 | A1* | 8/2003 | Chiu et al. | 370/349 |
| 2003/0216154 | A1* | 11/2003 | Mennenga et al. | 455/561 |
| 2007/0064745 | A1* | 3/2007 | Zeng et al. | 370/513 |
| 2007/0086423 | A1* | 4/2007 | Zeng et al. | 370/349 |

* cited by examiner

*Primary Examiner*—Duc Nguyen
*Assistant Examiner*—Julio R Perez
(74) *Attorney, Agent, or Firm*—Global IP Services, PLLC; Prakash Nama

(57) ABSTRACT

A system for receiving and handling a scrambled input data signal that includes a preamble with a start of frame delimiter (SFD) initiates an SFD search on the scrambled input data, thereby attempting to save an initialization period. The initialization period may be of the order of 7 uS, and its saving results in improved timeline management enabling antenna diversity and the possible use of high performance algorithms. The system may use two parallel paths for signal processing, each having an SFD detector and a descrambler. If the detected SFD is short, then the second path is disabled, and if it is long, then the first parallel path is disabled. Alternatively, the first path can be used for a finite period of time (for e.g., 40 symbols) and if the SFD is still not detected, the first path is disabled, and the system uses only the second path.

9 Claims, 5 Drawing Sheets

METHOD AND APPARATUS FOR FRAME SYNCHRONIZATION

RELATED APPLICATIONS

Benefit is claimed under 35 USC 119(e) to U.S. Provisional Application Ser. No. 60/549,677 entitled "A Novel Method and Apparatus for Frame Synchronization," filed on Mar. 2, 2004, which is incorporated by reference in its entirety for all purposes.

FIELD OF THE INVENTION

This invention generally relates to the field of wireless communications, and more particularly to wireless communications using local area networks (LANs)

BACKGROUND OF THE INVENTION

It is known that 802.11 relates to a family of specifications developed by the IEEE for wireless LAN technology and specifies an over-the-air interface between a wireless client and a base station or between two wireless clients. In one form, 802.11 applies to wireless LANs and provides 1 or 2 Mbps transmission in the 2.4 GHz band using either frequency hopping spread spectrum (FHSS) or direct sequence spread spectrum (DSSS). Of the several specifications in the 802.11 family, 802.11b (also known as 802.11 High Rate or Wi-Fi), refers to an extension to 802.11 that applies to wireless LANS and provides 11 Mbps transmission (with a fallback to 5.5, 2 and 1 Mbps) in the 2.4 GHz band. It is also known that 802.11b generally uses only DSSS and provides wireless functionality comparable to Ethernet. 802.11g in its application to wireless LANs provides 20+ Mbps in the 2.4 GHz band. 802.11b has a maximum raw data rate of 11 Mbit/s and uses the same CSMA/CA media access method defined in the original standard. Due to the CSMA/CA protocol overhead, in practice the maximum 802.11b throughput that an application can achieve is about 5.9 Mbit/s over TCP and 7.1 Mbit/s over UDP. 802.11b operates in the 2.4 GHz RF spectrum. Hence, metal, water, and thick walls absorb 802.11b signals and might decrease the range drastically. For DSSS (Direct Sequence Spread Spectrum) modulation, 802.11b uses BPSK (Binary Phase Shift Keying) for 1 Mbit traffic and QPSK (Quad-Phase Shift Keying) for 2 Mbit traffic. For higher data rate traffic it uses QAM (Quad-Amplitude Modulation) modulation. With high-gain external antennas, the protocol can also be used in fixed point-to-point arrangements, typically at ranges up to eight kilometers or longer where a line of sight is available. For security, WEP (Wireless Encryption Protocol/Protection) is used generally.

The 802.11g standard is designed as a higher-bandwidth—54M bit/sec—successor to the popular 802.11b, or Wi-Fi standard, which tops out at 11M bit/sec. Generally, an 802.11g access point will support 802.11b and 802.11g clients. Similarly, a laptop with an 802.11g card will be able to access existing 802.11b access points as well as new 802.11g access points. The 802.11 standard refers to a general MAC-layer and three different PHY-layers. The MAC-layer is the same for all the PHY-layers. The MAC layer is also responsible for fragmentation and encryption. It is known that MAC protocols in some applications arbitrate access to a shared channel among several users. MAC layer management is responsible for synchronization, power management, roaming and MAC-M1B. The standard as relating to Wireless LAN also defines two types of wireless networks, the first one being known as BSS (Basic Service Set). The BSS is a wireless network and is normally built up of PCs (or notebooks) with a wireless network card. The second one is the ESS (Extended Service Set) and is also called an 'Ad Hoc' network and connects the wireless stations to a wired network through one or more access points. The access point is actually a bridge between a wired network and a wireless network. The Medium Access Control (MAC) protocol is used to provide the data link layer of the Ethernet LAN system. The MAC protocol in one form encapsulates a SDU (payload data) by adding a 14 byte header (Protocol Control Information (PCI)) before the data and appending a 4-byte (32-bit) Cyclic Redundancy Check (CRC) after the data. The entire frame is preceded by a small idle period (the minimum inter-frame gap, 9.6 microseconds (µS)) and an 8 byte preamble. The purpose of the idle time before transmission starts is to allow a small time interval for the receiver electronics in each of the nodes to settle after completion of the previous frame. A node starts transmission by sending an 8 byte (64 bit) preamble sequence. This consists of 62 alternating 1's and 0's followed by the pattern 11. Generally, the last byte which finishes with the '11' is known as the "Start of Frame Delimiter", herein referred to as SFD. The SFD field of a frame indicates the beginning of a frame being transmitted. Typically, the SFD may consist of a one octet field that marks the end of the timing information and may contain the bit sequence 10101011. The octet field may be used both for synchronization and start of frame delimiting. Upon receipt of a frame, its frame check sequence may be checked for damage using CRC (cyclic redundancy check). In the context of 802.11, a preamble provides a clock at the start of each packet, which allows the receiving devices to lock the incoming bit stream. The preamble might use either an SFD or a synch field to indicate to the receiving station that the data portion of the message will follow. In one application, the preamble might comprise a preamble synchronization portion and an SFD portion. In the context of this invention, SFD is a pattern used for synchronization, and is usually known to be detected using descramble information taking an additional 7 uS.

SUMMARY OF THE INVENTION

Described herein are a method, a system and an article incorporating the method, for receiving and processing a scrambled input data signal that has a preamble with a start of frame delimiter (SFD) field. Rather than perform the SFD search on the descrambled data, the present approach is to perform the SFD search on the scrambled input data, thus reducing the requirement for descrambler initialization. Thus, an initialization period of the order of 7 uS is saved with resulting benefits and advantageous consequences. The time thus gained can be used with great benefit for higher performance algorithms that might require longer time periods. The present approach results in savings in the receiver timeline, thus paving the way for antenna diversity for short preamble situations. The inventive approach has specific application in communications governed by or relating to 802.11 b/g scenarios but can generally be applied in any situation involving SFD search/detection on scrambled data without limitation.

One embodiment of the invention provides a method of receiving and handling a scrambled input data signal that includes a start of frame delimiter (SFD), comprising: initiating an SFD search detection on said scrambled input data signal; and, subsequently descrambling the input data signal.

A second embodiment of the invention resides in a system for receiving and handling a scrambled input data signal that includes a start of frame delimiter (SFD), comprising: a first detector connected for initiating an SFD search on said scrambled input data signal, said first detector having an input and a detector output; and, a first descrambler connected to receive said detector output, wherein the first detector and the first descrambler form a first path for the input data signal, the system including a selectively operable second path comprising a second descrambler followed by a second detector.

Another embodiment provides article comprising a storage medium having instructions that when executed by a computing platform, result in execution of a method of receiving and handling a scrambled input data signal that includes a start of frame delimiter (SFD), comprising: initiating an SFD search detection on said scrambled input data signal; and, subsequently descrambling the input data signal.

BRIEF DESCRIPTION OF THE DRAWING

Embodiments of the invention will now be described by way of example only, with reference to the accompanying drawings in which like numerals generally refer to like components and wherein.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims. The present invention provides an improved technique for receiving and processing a scrambled input data signal that has an associated (Start Frame Delimiter) SFD field. The invention provides for savings in the receiver timeline due to a novel way of SFD detection and descrambler initialization. The inventive approach has specific application in the context of 802.11 b/g, but is applicable without limitation in other scenarios also. Since the descrambler in the 802.11b standard is a self-synchronizing structure (since the data received is also passed through the descrambler), typical receivers detect the SFD using the descrambled pattern, which requires an initialization period of 7 uS for the descrambler (noting that the symbol rate for the 11 b/g=1 MSPS during the preamble, and the descrambler in the context of 802.11b uses a generator polynomial of order 6). In the proposed structure, the SFD search is performed on scrambled data, which reduces the requirement of the descrambler initialization. The descrambler initialization in the proposed system is done using the SFD after the search for the SFD pattern is successful. As an alternative approach, a combined scheme of the SFD search using the descrambled pattern, and the scrambled pattern can be performed, so that the performance limitation due to the low signal-to-noise ratio (SNR) operation under long preamble does not occur.

Figure 1:
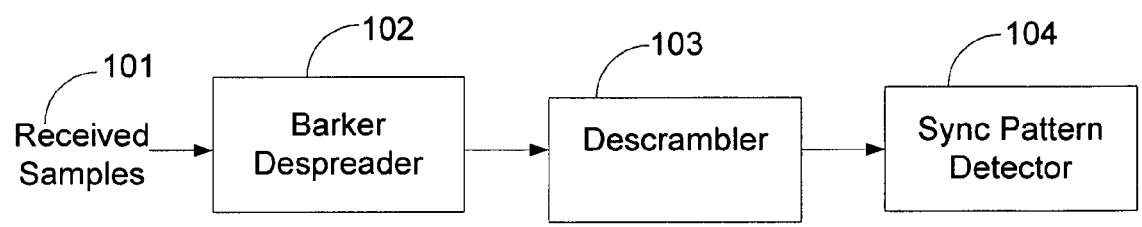
FIG. 1 illustrates a typical schematic for receiving signal samples for processing.

FIG. 1 shows how received samples 101 are optionally processed by a Barker despreader and subjected to self synchronizing in descrambler 103 and sent to synchronizing pattern detector 104. As shown in FIG. 1, the typical receiver arrangement detects the (Start Frame Delimiter) SFD using the descrambled pattern, which undesirably requires an initialization period of 7 uS. As shown in FIG. 1, the output of the despreader is passed through the self-synchronizing descrambler 103, which will undo the scrambling that was performed at the transmitter. The synchronizing pattern detector FIG. 1 shows how received samples 101 are optionally processed by a Barker despreader and subjected to self synchronizing in descrambler 103 and sent to synchronizing pattern detector 104. As shown in FIG. 1, the typical receiver arrangement detects the (Start Frame Delimiter) SFD using the descrambled pattern, which undesirably requires an initialization period of 7 uS. As shown in FIG. 1, the output of the despreader is passed through the self-synchronizing descrambler 103, which will undo the scrambling that was performed at the transmitter. The synchronizing pattern detector 104 will then look for the synchronization pattern in the output of the descrambler 103.

Barker codes, as applied herein are to be understood as spreading codes that are short sequences used in one shot schemes as compared to most other spreading codes which may be run continuously. Functionally, Barker codes are hard-coded and take the form of a pseudo-noise (PN) spreading code. Use of the spread spectrum is a modulation technique where a PN sequence modulates a data modulated carrier (increasing the bandwidth of the transmission, where the resulting RF signal has a noise-like spectrum made to look like noise to all except the intended radio receiver. The received signal is subjected to despreading by using a local PN sequence identical and in synchronization with the sequence at the transmitter.

Figure 2:
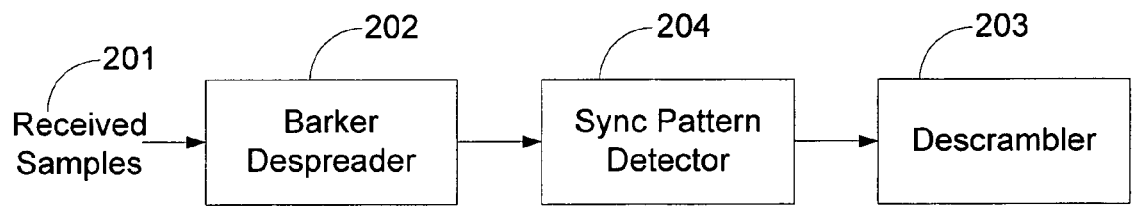
FIG. 2 illustrates one embodiment of an arrangement for receiving signal samples for processing with advantages.

As illustrated in FIG. 2 for example, received samples 201 are processed through despreader 202, synchronization pattern detector 204 and descrambler 203. In this configuration, instead of descrambling the received data and looking for the synchronization pattern, the scrambled version of the synchronization pattern is used for SFD detection. On detecting the scrambled synchronization pattern, the descrambler is initialized to undo the scrambling for the remaining data. Since SFD search is performed on scrambled data as shown in FIG. 2, there is a gain of about 7 uS thereby permitting at least, the following advantages: (1) Receiver Timeline management will enable antenna diversity for the short preamble; (2) Time gained can be used for higher performance algorithms requiring more time.

Figure 3:
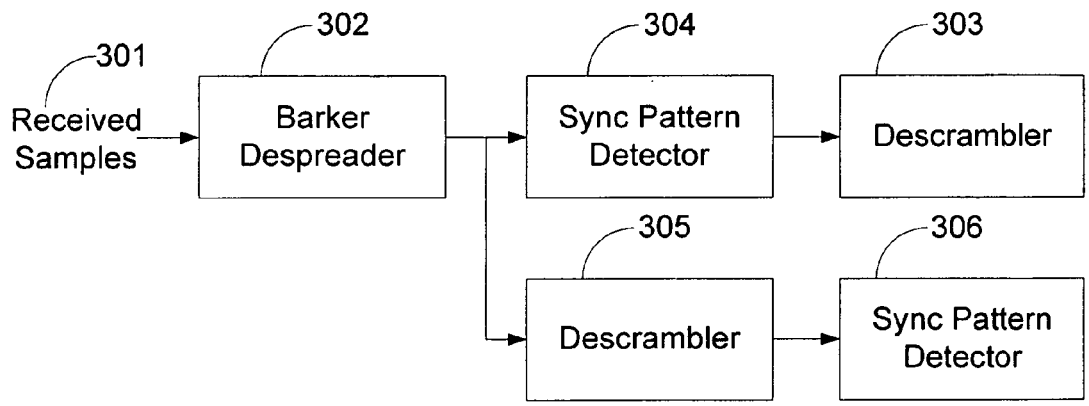
FIG. 3 illustrates a modified version of an arrangement for receiving signal samples for processing.
Figure 7:
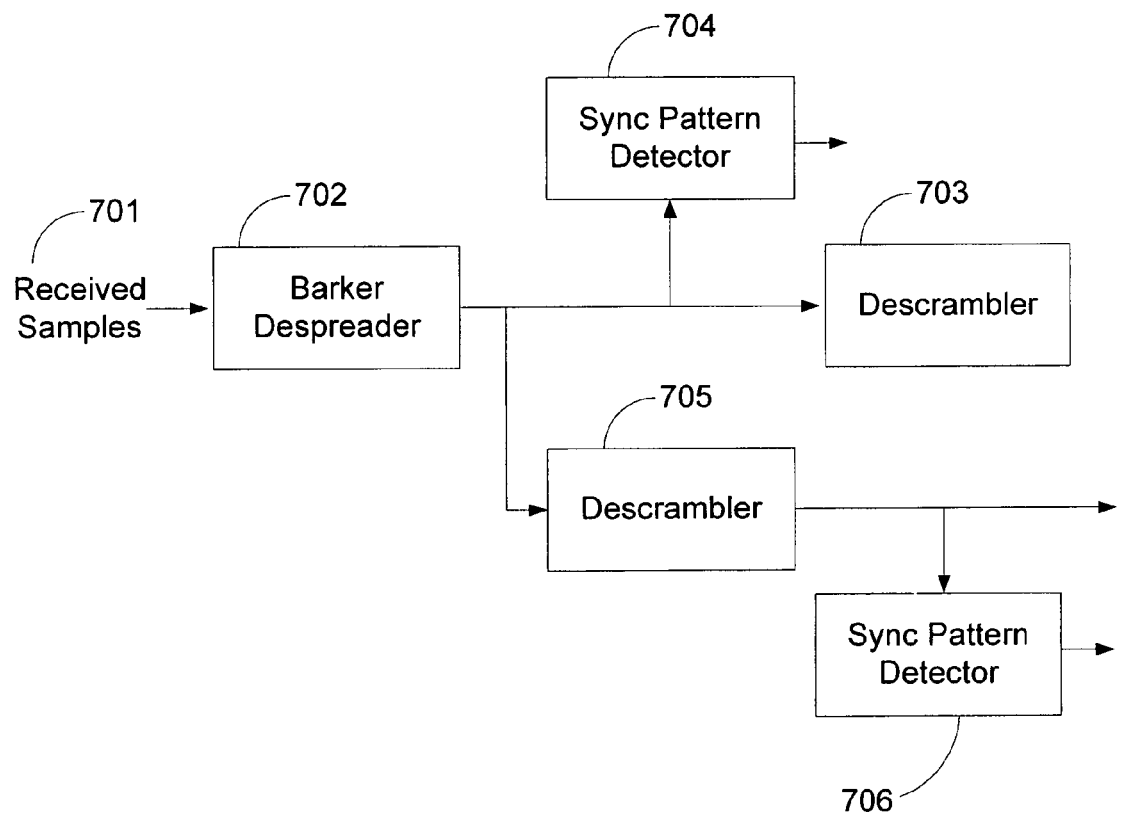
FIG. 7 illustrates a further modified version of the FIG. 3 arrangement.

FIG. 3 shows a schematic where the features of FIGS. 1 and 2 are combined for selective operation. As shown, FIG. 3 includes received samples 301, despreader 302, descrambler 303, synchronization pattern detector 304, a second descrambler 305, and a second synchronization pattern detector 306. The configuration of FIG. 3 uses two paths at the output of the Barker despreader. The first path is the same as that described in the context of FIG. 2, and the second path is the same as that described in the context of FIG. 1. In this configuration, both the paths at the output of the Barker despreader will be running in parallel. However, in case a particular SFD detection is not successful, the path corresponding to the FIG. 2 path is disabled. A further modification of the arrangement of FIG. 3 is illustrated in FIG. 7. FIG. 7 shows received samples 701, Barker despreader 702, first and second pattern detectors 704 and 706 respectively, and first and second descramblers 703 and 705 respectively. In the arrangement illustrated in FIG. 7, the same functional blocks as shown in FIG. 3 are used, except that direct outputs from the first and detectors 704 and 706 are made available, with modified connections as shown.

Figure 4:
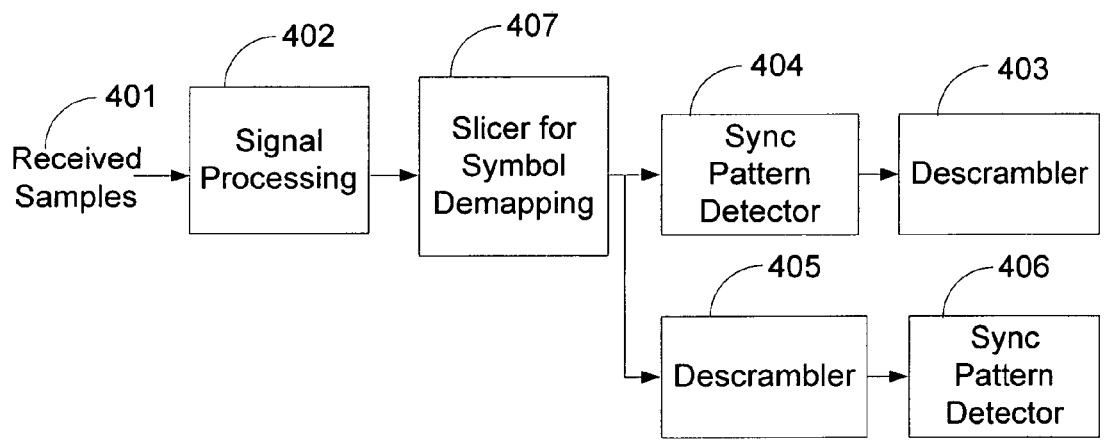
FIG. 4 illustrates a further modified block diagram of an arrangement for receiving signal samples for processing.

FIG. 4 shows a generic block diagram of a schematic that illustrates received signal samples 401, a signal processing block 402, a slicer for symbol demapping, first and second synchronizing pattern detectors 404, 406 respectively, and first and second descramblers 403 and 405 respectively. The FIG. 4 schematic is largely similar to the arrangement shown in FIG. 3 and has selectable first and second parallel paths, but with the addition of blocks 402 and 407. Functionally, the schematic of FIG. 4 has the added feature of the slicer for symbol demapping 407, which can be used for waiting for a predetermined time duration, e.g., 40 symbols, before the parallel path corresponding to FIG. 2 is interrupted.

By way of example, the above description and illustrations in the figures relate to 802.11 b/g as follows:

In 802.11 b/g, the synchronizing pattern which is of interest is called the SFD or the Start of Frame Delimiter. There are 2 SFD patterns defined i.e., the long SFD and the short SFD. In the case where the long SFD is used, there is generally enough time available to perform the synchronization operations as well as antenna diversity. In the case where the short SFD is used, there is sometimes not enough time for antenna diversity. While the approach represented in FIG. 2 will result in a time line saving that can be used for antenna diversity, the FIG. 2 approach might in some situations lead to some performance degradation. For the long SFD situation this performance degradation can be avoided as the time line saving is not necessary. This can be achieved by using the FIG. 3 configuration where two parallel paths are employed. In case where the first synchronization pattern detector 304 in FIG. 3 detects a short SFD, then the second parallel path (similar to the FIG. 1 path) will be switched off. In case where the synchronization pattern detector detects a long SFD, then the processing in the first parallel path (similar to the FIG. 2 path) will be switched off and that corresponding to the FIG. 1 configuration will continue to be used, thus minimizing any degradation for the long SFD case.

Another way of operation in the FIG. 3 configuration is to use the first parallel path (corresponding to FIG. 2) for a finite period of time (for e.g. 40 symbols) and if the SFD pattern is still not detected, the first parallel path is disabled, and the detection scheme switches to the one using only the second parallel path.

Figure 5:
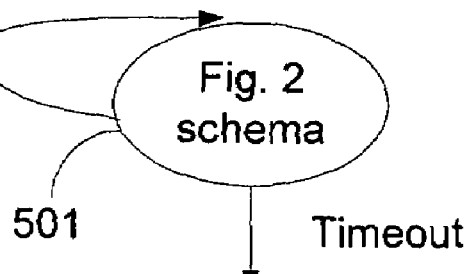
FIG. 5 illustrates two flow charts useful in the practice of the invention.
Figure 5:
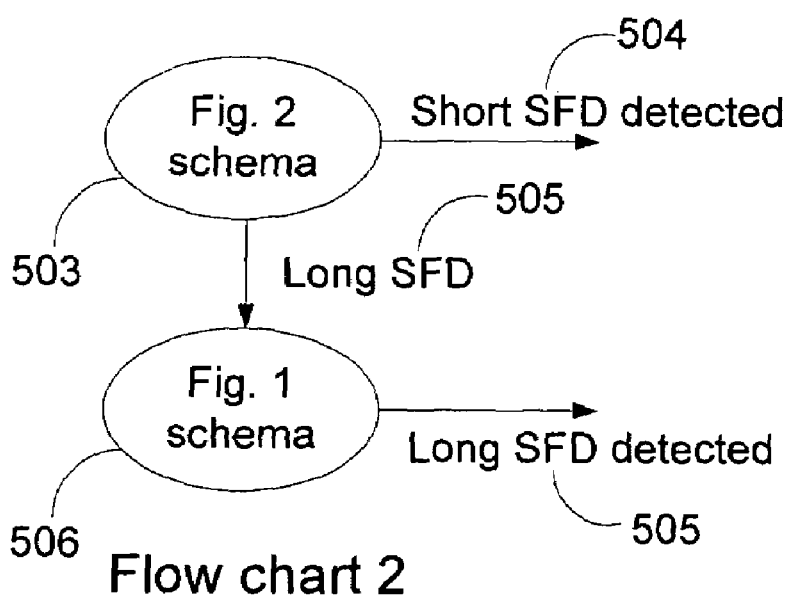

FIG. 5 shows two exemplary flow charts to cover operational situations occurring in the schematic shown in FIG. 3. Flow chart 1 illustrates a situation where as long as the predetermined timeout is not reached, e.g., 40 symbols, the operation continues with the FIG. 2 schematic 501. After the timeout, if SFD detection has not taken place, then the operation continues with the FIG. 1 schematic 502. Flow chart 2 addresses the handling of long and short SFDs. The operation will continue with the FIG. 2 schematic if a short SFD is detected. If a long SFD is detected, the operation continues with the FIG. 1 schematic.

Figure 6:
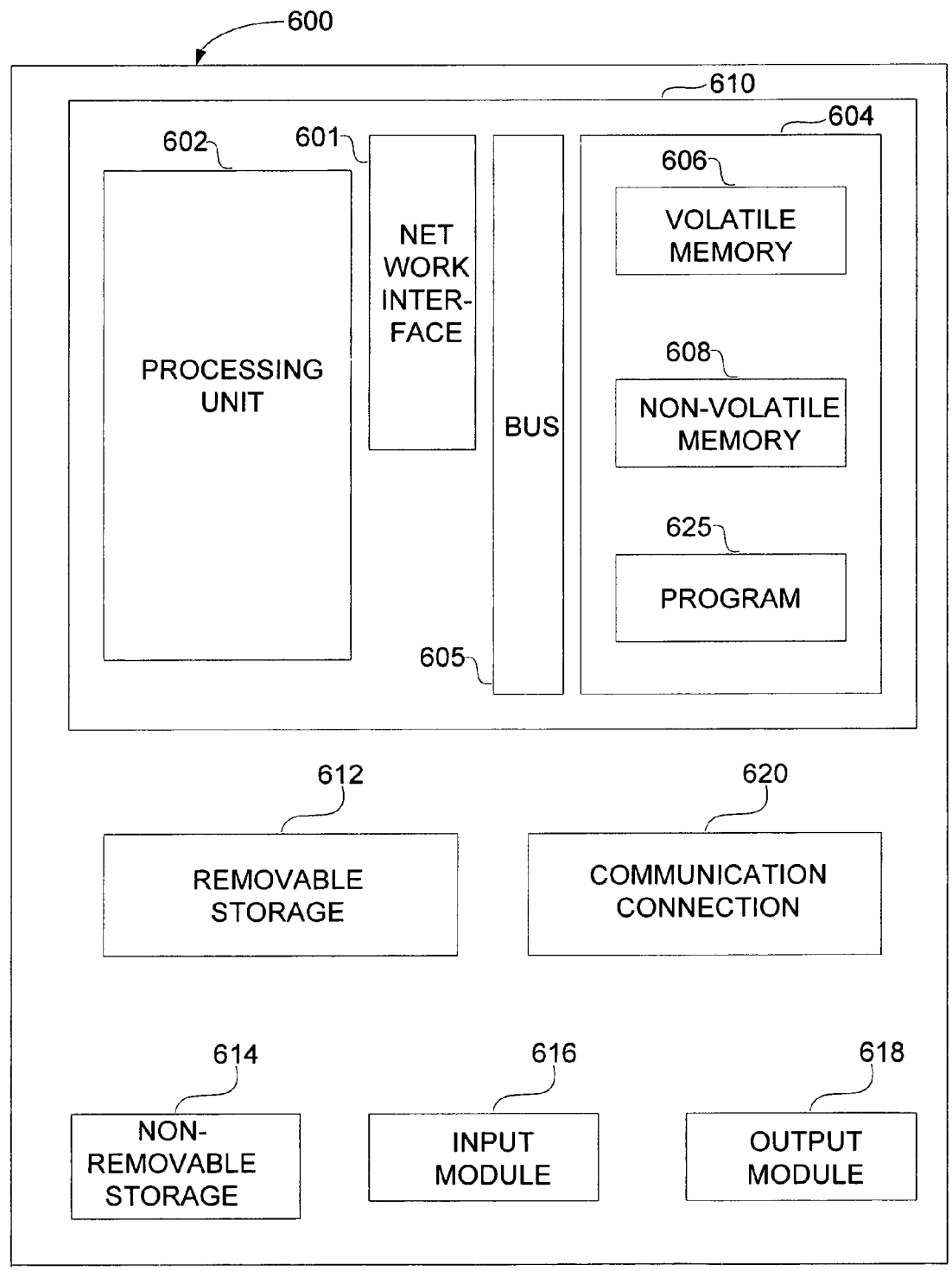
FIG. 6 is a block diagram of a typical computer system used for implementing embodiments of the present subject matter, such as those shown in FIGS. 3-5.

The time line management and the choice of the FIG. 2, FIG. 3 and FIG. 4 schematics may be managed by a computer platform or other equivalent that may be programmed suitably. FIG. 6 illustrates an example of a method and circuitry to accomplish this purpose. Various embodiments of the present subject matter can be implemented in software, which may be run in the environment shown in FIG. 6 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 6 shows an example of a suitable computing system environment for implementing embodiments of the present subject matter. FIG. 6 and the following discussion are intended to provide a brief, general description of a suitable computing environment in which certain embodiments of the inventive concepts contained herein may be implemented.

A general computing device in the form of a computer 610 may include a processing unit 602, memory 604, removable storage 612, and non-removable storage 614. Computer 610 additionally includes a bus 605 and a network interface (NI) 601.

Computer 610 may include or have access to a computing environment that includes one or more user input devices 616, one or more output modules or devices 618, and one or more communication connections 620 such as a network interface card or a USB connection. The one or more user input devices 616 can be a touch screen and a stylus and the like. The one or more output devices 618 can be a display device of computer, computer monitor, TV screen, plasma display, LCD display, display on a touch screen, display on an electronic tablet, and the like. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 604 may include volatile memory 306 and non-volatile memory 608. A variety of computer-readable media may be stored in and accessed from the memory elements of computer 610, such as volatile memory 606 and non-volatile memory 608, removable storage 601 and non-removable storage 614. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 602 of the computer 610. For example, a computer program 625 may include machine-readable instructions capable of handling a scrambled input data signal for performing SFD detection on the scrambled input signal according to the teachings of the described embodiments of the present subject matter. In one embodiment, the computer program 625 may be included on a CD-ROM and loaded from the CD-ROM to a hard drive in non-volatile memory 608. The machine-readable instructions cause the computer 610 to encode according to the various embodiments of the present subject matter.

The foregoing is the description of exemplary implementations of the method and apparatus for frame synchronization and descrambler initialization in a manner as to improve the receiver timeline management. An improved time line management enables antenna diversity and the use of higher performance algorithms that might require relatively more time. The above-described implementation is intended to be applicable, without limitation, to situations where SFD detection needs to be performed, as for example in 802.11 b/g scenarios. The description hereinabove is intended to be illustrative, and not restrictive.

The various embodiments of the improved time line management relating to frame synchronization described herein are applicable generally to any communication system, and the embodiments described herein are in no way intended to limit the applicability of the invention. In addition, the techniques of the various exemplary embodiments are useful to the design of any hardware implementations of software, firmware, and algorithms in the context of decoding in general. Many other embodiments will be apparent to those skilled in the art. The scope of this invention should therefore be determined by the appended claims as supported by the text, along with the full scope of equivalents to which such claims are entitled.

The invention claimed is:

1. A method of receiving and handling a scrambled input data signal that includes a start of frame delimiter (SFD), comprising:
   using a first signal processing path and initiating an SFD search detection on said scrambled input data signal; and, subsequently descrambling the input data signal after said SFD search detection;
   including the step of ascertaining if the SFD is a long SFD or a short SFD; and,
   further comprising the step of including a second parallel path for parallel processing of said input data signal, said second parallel path being configured for first descrambling said input data signal, and succeeded by an SFD search detection, and selectively turning off said first signal processing path if a long SFD is ascertained.

2. The method as in claim 1, including the step of selectively turning off said second signal processing path if a short SFD is ascertained.

3. The method of claim 1, including the step of using the first signal processing path for a predetermined time duration, and if the SFD detection is not successful, then selectively using only said second signal processing path.

4. A computer readable medium encoded with program instructions capable of being executed by a computer with program instructions stored in the computer readable medium to result in execution of a method as in claim 1.

5. A system for receiving and handling a scrambled input data signal that includes a start of frame delimiter (SFD), comprising:
   a first signal processing path including a first detector connected for initiating an SFD search on said scrambled input data signal, said first detector having an input and a detector output; and, a first descrambler disposed subsequent to said first detector and connected to receive said first detector output, said system including a selectively connectable second parallel signal processing path including a second descrambler followed by a second detector, and enabling said first signal processing path for a predetermined time duration for SFD detection to occur, and if the SFD detection is not successful, keeping only said second processing path open.

6. The system as in claim 5, wherein each said detector comprises a synchronizing pattern detector and performs a comparison between the received scrambled input signal and a pre-determined scrambled SFD sequence.

7. The system as in claim 6, including a despreader having an output, and an input connected to receive said scrambled input data signal, said despreader output being connected to an entry point of said first and second parallel signal processing paths.

8. The system as in claim 7, including means to selectively turn off said second signal processing path if a short SFD is ascertained, and to selectively turn off said first signal processing path if a long SFD is ascertained.

9. Apparatus for use with a local area network (LAN) for handling scrambled
   input data having a preamble with a start of frame delimiter (SFD) field, comprising:
   a first detector connected for initiating an SFD search on said scrambled input data signal, said first detector having an input and a detector output; and,
   a first descrambler connected to receive said detector output;
   wherein said first detector and first descrambler form a first signal processing path for the input data signal,
   said apparatus including a selectively connectable parallel second signal processing path comprising a second descrambler followed and succeeded by a second detector;
   said apparatus including means for enabling use of said second signal processing path for a predetermined time duration for SFD detection to occur, and if the SFD detection not successful, for keeping only said second signal processing path open.

* * * * *